United States Patent

[11] 3,621,217

[72] Inventors: Norman L. Carr, Allison Park; Allen E. Somers, Pittsburgh; Donald L. Stahlfeld, Glenshaw, all of Pa.
[21] Appl. No. 856,438
[22] Filed Sept. 9, 1969
[45] Patented Nov. 16, 1971
[73] Assignee Gulf Research & Development Company, Pittsburgh, Pa.

[54] SPECIAL-PURPOSE PROCESS CONTROL COMPUTER
9 Claims, 6 Drawing Figs.

[52] U.S. Cl. .................................. 235/151.12, 235/150.1, 208/DIG. 1
[51] Int. Cl. .................................. G06g 7/58, G06f 15/46
[50] Field of Search .................................. 235/150.1, 151.1, 151.12, 151.3, 34, 35; 208/DIG. 1, 138, 113; 202/160

[56] References Cited
UNITED STATES PATENTS
3,213,014  10/1965  Atkinson et al. .............. 208/113
3,316,322  4/1967   Glahn ..................... 208/DIG. 1
3,324,030  6/1967   Calabrese et al. ........... 208/DIG. 1
3,415,720  12/1968  Rijnsdorp et al. ........... 235/151.12 X
3,423,291  1/1969   Oglesby ................... 235/151.12 X
3,458,691  7/1969   Boyd ...................... 235/151.12
3,539,784  11/1970  Woodle ................... 235/151.12

OTHER REFERENCES
Engel: Computing Control Applied to a Fractionating Column, Control Engineering Sept. 1957, Vol. 4, p. 144/147.

Primary Examiner—Malcolm A. Morrison
Assistant Examiner—Felix D. Gruber
Attorneys—Meyer Neishloss, Deane E. Keith and William Kovensky ABSTRACT: A process-controlling computer wherein an analytical instrument is provided and is used as a standard against which to calibrate the model of the process in the computer. The process is of such a nature that the key output parameter cannot be measured until some length of time after the value of that parameter is internally determined in the process.

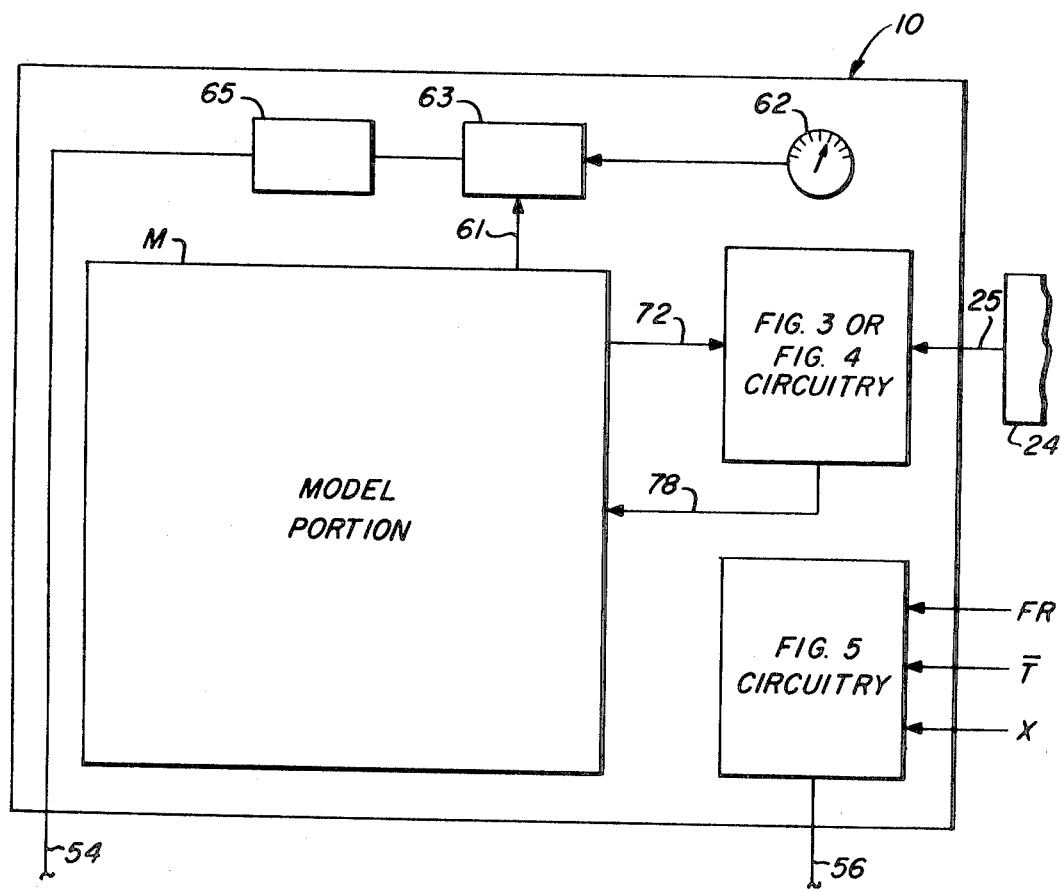

INVENTORS.
NORMAN L. CARR
ALLEN E. SOMERS
DONALD L. STAHLFELD

SPECIAL-PURPOSE PROCESS CONTROL COMPUTER

This invention pertains to computers, and especially to special purpose computers for controlling processes.

More in particular, the invention comprises a special-purpose computer for controlling the reactor portion of a hydrocarbon process, in which process the feed stock may first be pretreated and then passes through the reactor, and is finally passed through a fractionator or distilling tower in which the desired product is taken out.

The computer comprises a mathematical model of the process being controlled, and the invention also comprises means to calibrate the value of a selected key output parameter as calculated in the model against a value of said parameter as physically measured in the output stream of the fractionator downstream from the reactor portion.

In the following detailed description, the invention will be described in the environment of reforming of hydrocarbon feed stocks to make gasoline, but it will be understood that the invention is equally applicable to other processes both within and without the petroleum industry. For example, the invention could be used in oxidation, hydrogenation, cracking, and others. In fact, the invention could be used to control any process for which a mathematical model could be created. Similarly, the invention will be described in the environment of a special-purpose computer in analog form, but it will be appreciated by those skilled in the art that such a computer could be a digital device. These environments were chosen because an analog embodiment of the invention has been built and is successfully controlling a reforming unit.

The single most important characteristic of gasoline, from a marketing viewpoint, is its octane rating or number. As is known to those skilled in the art, octane rating is a number, currently of the order of magnitude of 100, which is a measure of the gasoline's tendency to "knock" when used in an engine, or, stated another way, a measure of its compressibility without self-igniting. The money value of gasoline increases with increasing octane number, and the various grades of gasoline as sold have various ranges of octane number guaranteed. Therefore, it is highly important that the octane number of gasoline by very accurately known by the refiner because if a higher octane fuel is sold as a lower grade much income is lost, and in any case, the octane number must be known so that the blended gasoline when sold, of whatever grade, will meet the guaranteed octane rating.

A reforming unit typically produces gasoline in large quantities on the order of 25,000 barrels per day. Consequently, a seemingly small error in octane number of the gasoline produced, as little as half an octane number, if continued on a regular basis, can mean a monetary loss in the range of multiple millions of dollars a year, and/or loss of customer goodwill. There is presently controversy in the industry as to which instrument for measuring octane number produces the most accurate result. Pain staking laboratory tests are the most accurate measure of octane rating, but such methods are not practical for automatic or continuous control. An important advantage of the present invention is that it may be used with any of these competing analyzers with virtually no changes to the special-purpose computer. This is so because the relationship between the computer and the analyzer is analogous to that between a service measuring device and a standard against which the service device is calibrated. The model of the process as embodied in the computer generates a signal predictive of the octane rating of the product leaving the reactor, which experiences no chemical changes between the reactor and the fractionator. Therefore, the model effectually predicts the octane rating of the products leaving the fractionator. The analyzer, of whatever type the refiner decides to use, analyzes the product leaving the fractionator, i.e., measures the octane rating. During periods of stable operation, the output of the analyzer is fed to the computer by means of a simple switch, the closing of which causes the model in the computer to update or calibrate its to the "standard," which is the analytical measurement.

Because of the nature of the reforming process, octane number of the output gasoline can only be physically measured downstream from the fractionator because the flowstream from the reformer to the fractionator contains other products. Therefore, measuring the octane number of the reformer reactor output would give erroneous data. The feed stock requires some substantial length of time to pass through the pretreator and the reactor and more time to get to and then through the fractionator. Thus, in attempting to control reactor conditions based on the octane of the output gasoline prior to the invention, there was an inherent time delay of at least 1 to 2 hours. That is, if the fractionator output octane number were measured and found to be off specification, at least 1 to 2 hours of production would be in error before the corrections to the reactor would have any effect on the final output gasoline. In this period of off-specification production, other disturbances, such as feed composition variations and the like, could cause further changes in reactor performance thus creating the need for more corrections during the first correction timelag and thereby making proper control more difficult to achieve. This problem is overcome in the present invention by utilizing feed-forward control techniques to calculate and control the octane number of the final product at the reactor outlet thus avoiding the long periods of production of off-specification product which are obtained with conventional feedback control techniques.

A necessary part of this invention was the development of a mathematical model which related octane number to feed properties and reactor operating conditions. Feed-forward techniques require such a model whereas conventional feedback techniques do not. The model is built into the special-purpose computer, and is specific for the particular reforming unit being controlled.

The model updating apparatus of the invention allows the model to be recalibrated, or updated, periodically or when it becomes apparent that the calculated and measured octane numbers do not agree, due to the effect of computer drift or to the effect of unknown operating variables.

The computer of the invention also provides automatic halogen/water content control means. As is known, in reforming, as well as in many other processes, various halogens such as chlorine and fluorine are required for such purposes as accommodating moisture content, and assuring proper catalyst performance in the reactor. Heretofore, halogen addition was essentially a "by guess" process base on experience. Typically, an operator would look at performance and other process data and, based on his experience, decide that so many pounds of halogen should be added for the next operating period, usually one day. That much material was usually mixed into an amount of feed stock to make up a known quantity of mixture and fed into the process at a uniform rate over the operating period. Such a method is on its face not optimal in that it is at the outset based on a guess, and secondly has no means to accommodate changing conditions within the operating period, such as a slug of moisture of other sharp perturbation.

In contrast to this prior method, the present invention provides an automatic halogen control circuit integrated with a water analyzer and the model of the reactor with means to continuously supply halogen as required by changing reactor conditions. As will be apparent to those skilled in the art, this portion of the invention can be used in other processes. For example, isomerization, wherein the halogen is also chlorine, and hydrocracking wherein the halogen is fluorine, and other petrochemical processes.

Another feature of the invention is the provision of means to generate and feed correction signals produced when the computer calculated octane number is compared to the measured octane number to the model for updating purposes. Two embodiments of such apparatus are provided. In the first embodiment, an integrating circuit is interposed between the device which generates said correction signal and the means in the computer to recalibrate the model. Such an integrator performs satisfactorily but because of the needed low-drift characteristic requires fairly expensive electronic equipment. In the preferred form, a servo potentiometer is interposed in place of the integrator, and produces a functionally identical result. The advantage is that the cost of the servopotentiometer is roughly a tenth of the cost of the integrator.

The above and other advantages of the invention will be pointed out or will become evident in the following detailed description and claims, and in the accompanying drawing also forming a part of the disclosure, in which:

FIG. 1a is a schematic showing of the manner in which certain portions of the invention cooperate with the control computer;

Figure 1:
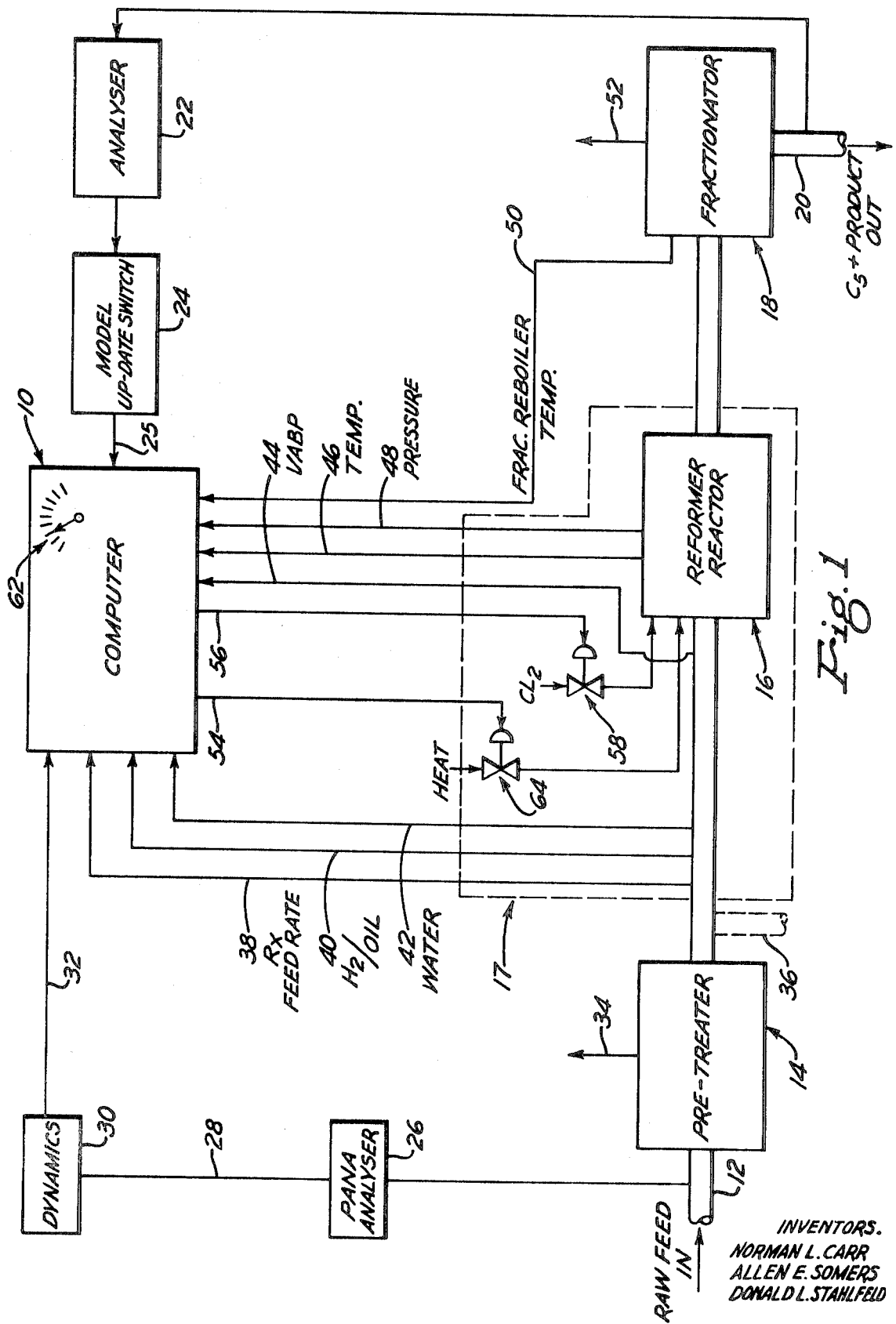
FIG. 1 is an overall schematic showing the invention in use with a reforming process.

Referring now in detail to the drawing, there is shown in FIG. 1 a computer 10 controlling a reforming process which comprises a conduit 12 which first feeds a pretreater 14, then a reformer reactor section 16, and finally a fractionator 18, with the desired product, gasoline, exiting via a conduit 20. In some reforming installations, the pretreater can be omitted dependent upon the nature of the feed and the end product desired. Dotted line box 17 indicates the reactor system, which comprises the reactor section plus furnaces, piping, heat exchangers, and the like well known to those skilled in the art. In controlling the process indicated by reference numerals 12 through 20 inclusive, computer 10 cooperates with an automatic octane analyzer 22 and an updating or calibration switch 24. However, invention also resides in the use of a computer implemented model of the process to control a catalytic reforming process or the like, even without the updating feature. Line 25 completes the interconnections between conduit 20, analyzer 22 and switch 24 in series circuit into computer 10. Computer 10 includes a model of the process 12 through 20 which is fed data from the process, as will appear below, from which data generates a signal predictive of the computer the octane rating of the output gasoline leaving the reactor 16, which, some time later and after physical separation is the same as the octane rating of the gasoline. The computer model portion does so on the basis of the material presently in the reactor 16. That is, based on process data presently received, via suitable dynamic corrections, the computer model portion predicts the value of the key parameter, octane rating, of the product leaving the fractionator based on the predicted octane rating of the product leaving the reactor. This broad type of control is known as "feed forward" in the computer and process control fields. Feed forward control eliminates periods of production of off specification products such as occur in prior feedback methods wherein corrections are made in response to measured final product data.

In cooperation with the feed forward control, the invention provides means to recalibrate the computer model portion to some standard, the selection of which is left unhindered by the invention, to correct any drifting or other unexpected change, which could occur in either the computer 10, the reformer reactor 16, or these two elements in combination.

A plurality of analyzers suitable for use as analyzer 22 are commercially available. For example, octane analyzers made by Du Pont or by Ethyl, or a device known as "MONIREX" made by Universal Oil Products. In the embodiment of the invention which has been built and is in successful use, the "MONIREX" instrument listed above was utilized. Switch 24 is a toggle switch springloaded to the off position. Thus, analyzer 22 is connected to the calibration circuitry of computer 10 only when and only for so long as the operator manually moves and holds switch 24 to close the circuit. The output of analyzer 22 should not be directly connected to the recalibration circuitry of computer 10 because minor changes, perturbations, or the like, which would otherwise be compensated for by computer 10, would be constantly causing recalibration and perhaps other major changes within the computer model. Further, if such a system should experience a peculiar set of changes in process parameters, such as a rapidly cycling but minor change in feed stock makeup or pressure, fractionator operation, or the like, it is possible for a cascade, or multiplication of error, or infinite loop type of situation to arise within the circuitry of the computer, causing it to "run away with itself," which would bring the usual safety equipment into play to which would first take the computer off line, and could even shut the process unit down.

Thus, the provision of an accepted standard, provided by any selected analyzer, in combination with a feed forward type of control computer, with a momentary make normally open switch interconnecting the analyzer and the recalibration portion of the computer, forms an important part of the present invention. The model updates itself, when the switch is closed, as will appear below, by comparing the instrument-measured octane number signals with the octane number signal as calculated by the model. Any difference causes changes within the model until these two octane numbers are equal. HH It is necessary to known the composition of the raw feed stock in order to predict the octane rating of the product in conduit 20. To this end, a feed stock analyzer 26 is provided. The feed stock to reformers normally consist of solely paraffins, aromatics and naphthenes. It is known that octane number increases in direct proportion to aromatics content. Analyzers suitable for use as analyzer 26 are commercially available, but an analyzer invented by some of our coworkers has been found to be particularly suitable for use in the invention. This device is known as PANA, which is an acronym for paraffin, aromatics and naphthenes analyzer. This device is disclosed and claimed in a copending application Ser. No. 693,362, filed Dec. 26, 1967, by Richard T. Mator, James A. Petrocelli, and Thomas J. Puzniak, entitled "Method and Apparatus for Separating Mixtures of Hydrocarbons," now U.S. Pat. No. 3,550,428, and assigned to the same assignee as the present invention. X The signals from PANA, indicating feed stock makeup, are fed via a line 28 to a dynamics correcting circuit 30, and thence to computer 10 via a line 32. Dynamic correcting means 30 may comprise part of the hardware of computer 10. The dynamics correction is needed to compensate for the time elapsed between the time when a feed stock analysis is made and the time when that same sample passes through the process from 12 through 16.

The essential purpose of optional pretreater 14 is to remove contaminants from the feed stock before it enters the reactor reformer section 16. Such contaminants includes sulfur, nitrogen, oxygen, arsenic, and others. Pretreater 14 may be any of several devices available in the art, one popular such unit being known as a "HYDROBON" unit. Arrow 34 indicates gaseous products, usually waste, generated by the pretreater, is usable as a component of jet aircraft fuel. A conduit 36 is shown in dotted lines to indicate the optional feature of tapping process 12 to 20 at this stage for jet fuel. After optional conduit 36, the feed stock in conduit 12 is measured as to several parameters to generate data required by computer 10. To this end, four lines 38, 40, 42, and 44 indicate suitable conventional measuring devices to feed data concerning the feed rate into the reformer reactor section, the hydrogen to oil ratio, the moisture content, and volumetric average boiling point (VABP), data, to the computer. Similarly, three lines 46, 48 and 50 are provided to feed data from the reformer reactor section 16 and from the reboiler of the fractionator 18 to computer 10. Each of these lines, as explained above in regard to lines 38, 40, 42 and 44, indicates appropriate conventional equipment associated with the process 12 through 20 to generate the data indicated. Line 46 feeds reactor section temperature data, line 48 feeds pressure data, and line 50 feeds data on the temperature within the fractionator reboiler to computer 10.

In regard to line 50 and the fractionator reboiler temperature, the invention is able to predict the octane rating of the liquid product leaving the fractionator via conduit 20 even though this liquid product is a varying part of the total material entering the fractionator. There is a direct relationship between the temperature in the fractionator reboiler and the amount of inflow to the fractionator which leaves the fractionator in the form of gases as indicated by arrow 52. Thus, the varying fraction taken off as liquid is accommodated in the computer by the fractionator reboiler temperature data delivered on line 50, and this accommodation can be handled as either a correction to the calculated octane number or as a correction to the measured octane number. In the successful embodiment of the invention, the accommodation was made as a correction to the measured octane rating.

Means are provided to permit manual selection of the octane rating of the gasoline exiting from the system in product conduit 20, to control the operation of the reactor section 16, and to automatically control chlorine addition to the reactor.

To these ends, a pair of control lines 54 and 56 deliver control signals from the computer 10 to chlorine addition means 58 and to an array of heat-controlling elements 64. Heat control line 54 includes temperature controllers, flow controllers, adding relays, and remote loading stations, arranged in the usual manner to provide proper heat control, as is well known to those skilled in the art.

Heat controller 64 may be though of as a remotely controlled valve with the signals on line 54 opening and closing the valve as required to increase the amount of heat supplied through device 64 to the reformer reactor. As is well known to those skilled in the art, reforming is basically an endothermic reaction, and relatively large quantities of heat must be supplied. Various reforming installations differ in their details. Accordingly, all the physical manners by which correction signals on line 54, under computer control, could control the heat supplied to the reformer are indicated by the schematic showing of heat control means 64.

FIG. 1a is a diagrammatic presentation of the manner in which certain portions of the invention cooperate with the several parts of the computer 10. The bulk of the computer comprises a model portion M which implements the mathematical simulation of the process being controlled. The interaction of the various other blocks shown in FIG. 1a with model portion M will be described below as this specification progresses.

On computer 10 there is provided octane set pointer means 62 by which the operator manually selects the desired octane number of the product in conduit 20, see FIGS. 1 and 1a. Set pointer 62 is built around a summing amplifier 63 which compares two signals. One signal is proportional to the desired octane number manually set on the scale of device 62. The second signal is proportional to the octane number produced by the model portion M of computer 10 is based on measured values, as described above and is delivered on a line 61 to amplifier 63. Any error signal produced is fed to a master controller 65 contained within computer 10, which converts any such octane number error into a temperature correction signal which is fed via line 54, and the components therein, to heat controlling elements 64. Thus, the operator simply adjusts set pointer 62 to control the octane number of the final product, gasoline, leaving via conduit 20.

Chlorine control means 58 receive computer control signals via line 56, and control the input of chlorine to the reactor in accordance therewith. Control means 58 and 64 are similar on the drawing, and this is done, as explained above, to indicate that all of the various physical control means at the process are encompassed within the scope of the invention.

The remaining FIGS. show various portions of the circuitry of computer 10. As stated above, and as shown in FIG. 1a, the largest part of computer 10 is devoted to the mathematical model M of the entire process. Modeling complicated processes is of itself old in the art. As to reformers, such models have been made before but not for the purpose of controlling reformer product octane, and a fuller discussion can be found in Chemical Engineering Progress, Vol. 59, No. 2, Feb. 1963, an article entitled "A Dynamic Model of a Catalytic Reformer" by W. G. Welter.

Figure 2:
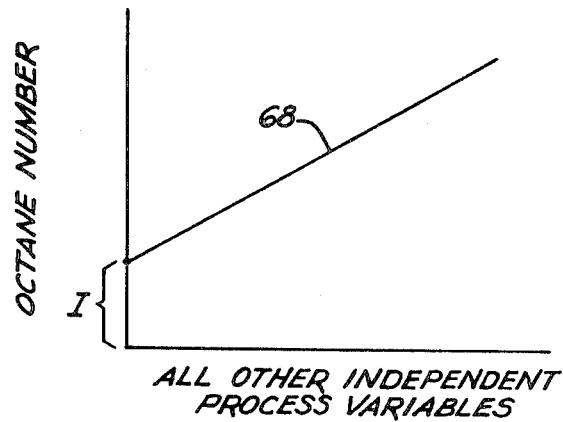
FIG. 2 is a curve useful in explaining the operation of part of the computing circuitry.

Referring now to FIG. 2, there is shown a curve 68 which represents the relationship between octane number of the gasoline in conduit 20 produced by the process as the ordinate plotted against all other independent process variables together as the abscissa. The octane number range shown is only the area of interest in a commercial refinery, a range of about 10 octane numbers, and the curve has been found to be a substantially straight line over that relatively small range. The range of interest is usually about 85 to about 95, research octane numbers, without additives before blending. The intercept of curve 68 with the ordinate scale is indicated on the drawing by "I." Intercept "I" may be thought of as a correction for the remainder of the curve. The curve itself is accurate as to shape. Thus, when the update switch 24 is operated to cause the computer 10 to recalibrate to a value as determined by analyzer 22, the effect of this operation is to cause a change in the value of intercept "I" without a change in the shape of curve 68.

Figure 3:
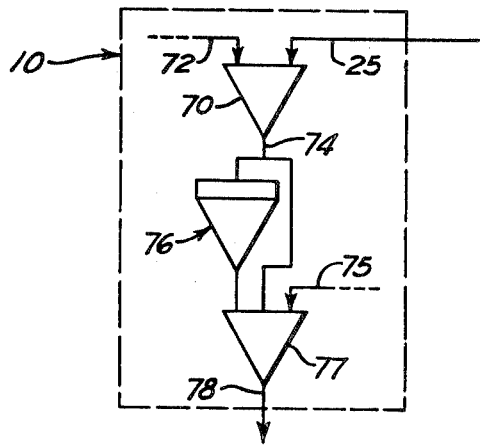
FIGS. 3 and 4 are two embodiments of another part of a circuitry.
Figure 4:
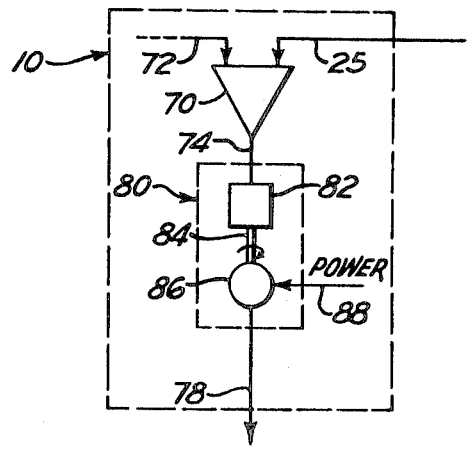

Referring to FIGS. 3 and 4, two alternative means within computer 10 for producing the recalibration signal are shown. In both cases, there is shown a logic module 70 which is essentially an algebraic adder. Adder 70 receives two inputs, update signals on line 25 from analyzer 22 via switch 24, and the computer calculated octane number on a line 72 internal to computer 10. Adder 70 produces a signal on its output line 74 which is the algebraic sum of the two signals on lines 25 and 72.

In the FIG. 3 embodiment, this correction signal is fed to an integrator 76 and to an algebraic adder 77. The previous signal proportional to the previous intercept I is also fed to adder 77 on a line 75 internal to computer 10. The FIG. 3 circuit corrects the previous intercept signal on line 75 by an amount proportional to the error produced by adder 70 and proportional to the integral of the same error produced by integrator 76. The integrator is required to hold its current value when the error signal on line 74 goes to zero which occurs when the model updates. The ability to hold a signal on integrator 76 requires that that integrator have low drift capabilities, which type of equipment is exceedingly expensive. Referring to FIG. 1a, the final output signal on line 78 is delivered to model portion M to update the model. The system of FIG. 3 works satisfactorily, but suffers from the disadvantage that the integrator 76 and the associated circuitry is relatively expensive, its cost being several thousands of dollars.

Referring to FIG. 4, parts described above in regard to FIG. 3 carry the same reference numerals, and the essential difference is that a servopotentiometer 80 has been substituted for integrator 76 and adder 77. As will appear below, a functionally identical result is obtained from the servo potentiometer 80, but device 80 is commercially available at a cost only a few hundred dollars, roughly one-tenth the cost of the FIG. 3 circuitry. Device 80 is commercially available from Beckman Instruments, Helipot Division, Fullerton, Calif. Model No. 943 G560.

Servopotentiometer 80 comprises a motor 82 which is driven by the correction signal on line 74. Motor 82 has an exceedingly high gear ratio on the order of 500 to 1. Thus, a finite period of time, on the order of 60 seconds is required for the motor to turn the finite number of turns which is proportional to the magnitude of the correction signal produced by adder 70 and delivered to the motor on line 74. The motor shaft 84 drives a rheostatlike device 86 which is independently fed power from a suitable supply not shown on a line 88. Thus, in operation, the correction signal drives the motor, which takes some length of time to turn a proportional number of turns, which moves the rheostat a proportional amount, which proportionally feeds power from line 88 through rheostat 86 to line 78 and to the recalibration means in the computer.

Thus, the amount of power fed out on line 78 to model portion M is proportional to the original correction signal on line 74, and is built up to its full value over some finite period of time. Further, some signal is always automatically present on line 78, thus obviating the need for a low drift integrator 76, or anything else, to separately hold the signal. Line 75 and the need to feed in the previous signal is also eliminated.

Figure 5:
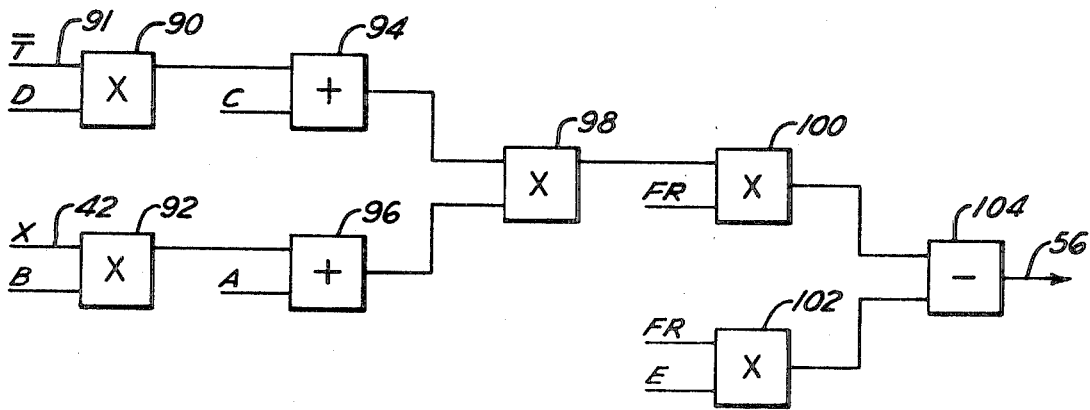
FIG. 5 is a schematic or logic diagram type of illustration and the halogen control portion of the computer.

Referring now to FIG. 5, there is shown the part of computer 10, in block form, which accomplishes automatic halogen addition. As shown in this FIG. 5 and in FIG. 1a, the halogen circuitry is functionally independent of the remainder of computer 10. In reforming, the halogen used is chlorine, but other halogens are utilized in other processes under conditions somewhat similar to those in reforming, as mentioned above.

It is known that the total halogen required is a function of the average reactor temperature and the moisture content of the recycle gas. Water content is determined by a suitable instrument indicated in FIG. 1 by line 42, and is fed to the computer 10. At present, the state of the art indicates that it is best to minimize moisture content. The following equation is designed to maintain a more or less arbitrary small quantity of moisture, but the constants can easily be adjusted to maintain some other moisture content. Some halogen is inherently consumed or lost in the process. By reduction of empirical data, the following equation was generated for automatic halogen addition: $H=[(A+bx)(XC+\overline{dt})(fr)]-ti\ e(fr)$
wherein, letters $A$ to $E$ inclusive are constants, $FR$ is the present halogen feed rate, $H$ is the total halogen requirement per day and is proportional to the change in feed rate $FR$ needed at any instant, $\overline{T}$ is the average reactor temperature, and $X$ is moisture content.

Referring to FIG. 5 and the equation above simultaneously, the drawing is almost self-explanatory. Each block represents a logic or function module which performs that arithmetic function indicated by the symbol on it. Multipliers 90 and 92 produce signals proportional to the values of the quantities $D\overline{T}$ and $BX$ respectively. The constants D and B may be produced with a manually controlled potentiometer modulating a source with the computer, or by other means equally well known to those skilled in the computer art. $\overline{T}$ is internally generated in the computer from temperature data and is supplied on a line 91. X is supplied on line 42, as explained above. Modules 90 and 92 feed a pair of addition modules 94 and 96, respectively, which produces signals proportional to the expressions $(C+D\overline{T})$ and $(A+BX)$, respectively. The outputs of modules 94 and 96 feed a multiplier 98, the output of which feeds a multiplier 100. A signal proportional to FR, generated by halogen addition means 58 and fed to computer 10 by means not shown, is fed to modules 100 and 102. Multiplier 102 is fed a signal proportional to constant E. Multipliers 100 and 102 thus produce the halves of the right side of the equation above on either side of the minus sign, and the halves are subtracted from each other in a module 104, to thereby produce a signal proportional to H which is fed on line 56 to halogen control means 58.

While the invention has been described in detail above, it is to be understood that this detailed description is by way of example only, and the protection granted is to be limited only within the spirit of the invention and the scope of the following claims.

We claim:

1. In combination with a process which is of such a nature that a key output parameter of said process cannot be measured until some finite period of time after said process has determined the value of said key parameter within itself, automatic control means comprising a control computer including an implemented mathematical model of the process, and said implemented mathematical model including a recalibration portion, the improvement comprising means to measure the valve of said key output parameter at the output end of said process, and means to periodically supply signals from said measuring means to said recalibration portion of said implemented model of the process to cause said implemented model to recalibrate itself to the measured value of said key output parameter.

2. The combination of claim 1 wherein said process is reforming of hydrocarbon feed stocks to produce gasoline and comprises a series arrangement of a reformer reactor and a fractionator, and wherein said key output parameter is the octane rating of the output gasoline.

3. The combination of claim 2, said measuring means comprising a MONIREX automatic octane analyzer, and said periodic signal supplying means comprising a manually operated toggle switch spring loaded to the off position.

4. The combination of claim 1, said means to periodically supply signals comprising an algebraic adding module adapted to receive signals proportional to the measured value of said key output parameter from said measuring means and signals proportional to the value of said key output parameter as calculated by said control computer, and means to feed a correction signal produced by said adding means to the recalibration portion of said computer.

5. The combination of claim 4, said correction signal feeding means comprising a servopotentiometer.

6. The combination of claim 4, said correction signal feeding means including a low-drift integrator.

7. The combination of claim 2, wherein said reforming process is controlled by adjustment of the amount of heat supplied to said reformer reactor, and wherein the control signals from said computer control said heat supply means, octane rating set pointer means incorporated into said computer, whereby said heat supply means are controlled by error signals produced by said set pointer means from comparisons of a signal generated within said set pointer means proportional to the manually determined octane rating of the output gasoline, and a signal from said computer proportional to the computer calculated value of the octane rating of the output gasoline.

8. The combination of claim 2, said control computer further comprising means to automatically and continuously add chlorine to said reformer reactor in varying quantities determined by said computer from the average reactor temperature and the moisture content of the material in the reactor system.

9. The combination of claim 8, wherein said computer continuously determines the amount of chlorine needed to be added by the expression:
$$H=[(A+bx)(C+\overline{dt})(fr)]-E(fr)$$
wherein, letters $A$ to $E$ inclusive are constants, $FR$ is the present halogen feed rate, $H$ is the total halogen requirement per day and is proportional to the change in feed rate $FR$ needed at any instant, $\overline{T}$ is the average reactor temperature, and $X$ is moisture content.

* * * * *

PO-1050
(5/69)

UNITED STATES PATENT OFFICE
CERTIFICATE OF CORRECTION

Patent No. 3,621,217      Dated November 16, 1971

Inventor(s) Norman L. Carr, Allen E. Somers, Donald L. Stahlfeld

It is certified that error appears in the above-identified patent and that said Letters Patent are hereby corrected as shown below:

Column 4, line 57, after "pretreater", change comma to a period and insert --As is known, reformer feed stock, after pre-treatment,--

Column 5, line 30, after "increase" insert --and decrease--.

Column 5, line 54, after "10" insert --which--.

Column 7, line 27, change the formula to read as follows:

$$--H = [(A + BX)(C + D\overline{T})(FR)] - E(FR)--$$

Column 8, claim 1, line 9, "valve" should be --value--.

Column 8, claim 7, line 44 after "determined" insert --desired--.

Column 8, claim 9, change the formula to read as follows:

$$--H = [(A + BX)(C + D\overline{T})(FR)] - E(FR)--$$

Signed and sealed this 3rd day of October 1972.

(SEAL)
Attest:

EDWARD M. FLETCHER, JR.        ROBERT GOTTSCHALK
Attesting Officer                 Commissioner of Patents